United States Patent

[11] 3,587,559

| [72] | Inventor | Kenshichi Nonaka<br>No. 24-9 Minown, 1-chome, Taito-ku, Tokyo, Japan |
|---|---|---|
| [21] | Appl. No. | 826,855 |
| [22] | Filed | May 22, 1969 |
| [45] | Patented | June 28, 1971 |
| [32] | Priority | Mar. 7, 1969 |
| [33] | | Japan |
| [31] | | 44/20023 |

[54] WATER-HEATING APPARATUS UTILIZING SOLAR RAYS
2 Claims, 5 Drawing Figs.

| [52] | U.S. Cl. | 126/271 |
|---|---|---|
| [51] | Int. Cl. | F24j 3/02 |
| [50] | Field of Search | 126/270, 271 |

[56] References Cited
UNITED STATES PATENTS

| 1,093,498 | 4/1914 | Thring | 126/271 |
|---|---|---|---|
| 1,672,750 | 6/1928 | Christiansen | 126/271 |
| 1,673,429 | 6/1928 | Vinson | 126/271 |
| 2,277,311 | 3/1942 | Freeman | 126/271 |
| 3,102,532 | 9/1963 | Shoemaker | 126/270 |

*Primary Examiner*—Charles J. Myhre
*Attorney*—Cushman, Darby & Cushman

ABSTRACT: An apparatus for heating water by solar rays in which a plurality of spherical lenses are used to enable solar rays to be converged whenever there is sunlight present. Also incorporating a superheat resisting carbon impregnated cloth to cover that area of metal which is subjected to the intensive heat of the focused rays.

PATENTED JUN 28 1971

INVENTOR
Kenshichi Nonaka

BY
Cushman, Darby & Cushman
ATTORNEYS

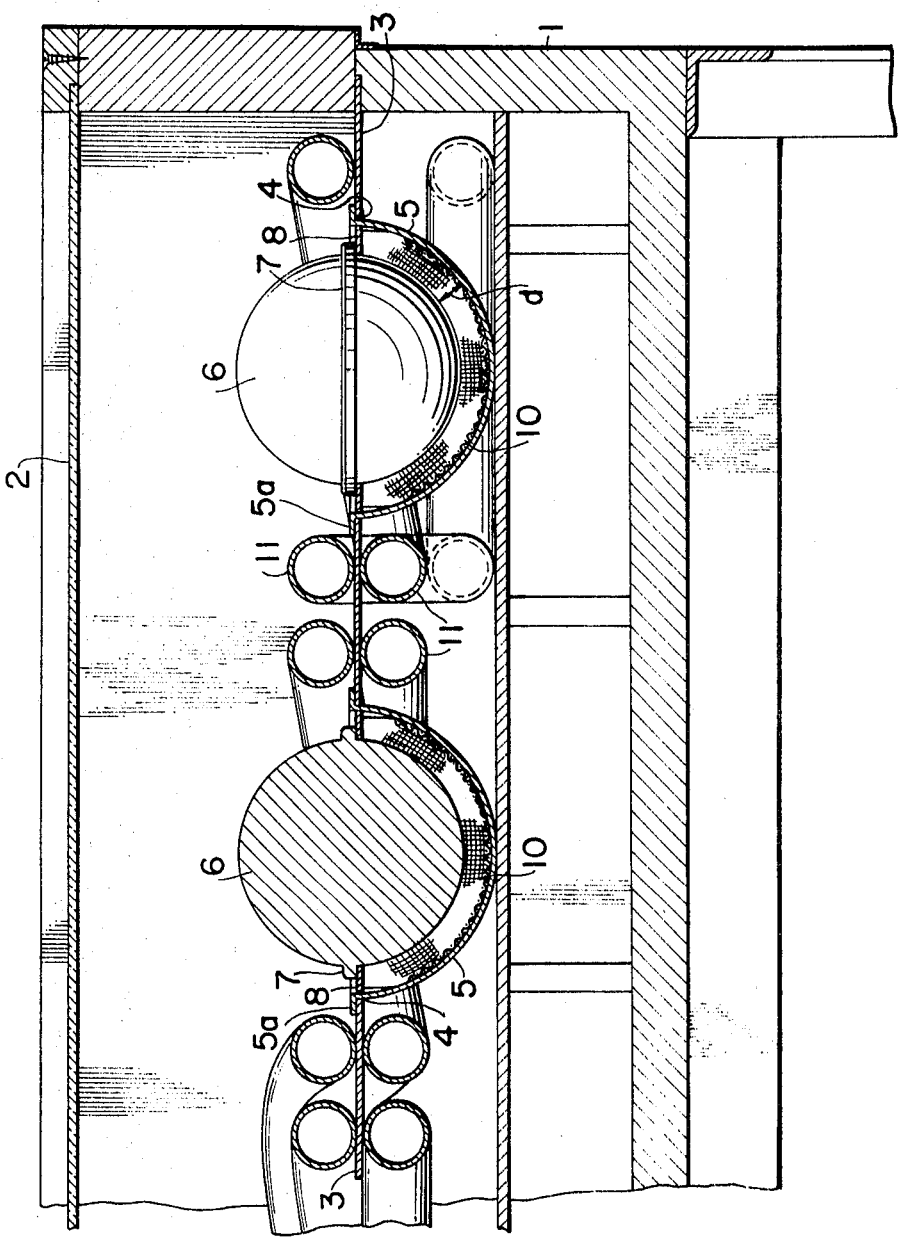

PATENTED JUN28 1971

INVENTOR
Kenshichi Nonaka

BY
Cushman, Darby & Cushman
ATTORNEYS

WATER-HEATING APPARATUS UTILIZING SOLAR RAYS

BACKGROUND OF THE INVENTION the present invention relates to a system for collecting solar heat, more particularly to an apparatus for heating water by solar rays.

An apparatus for heating water by solar rays in which ordinary convex lenses (plano-convex or convexo-concave lenses) are employed have heretofore been known. Such a conventional apparatus does not efficiently heat water as such lenses are not effective all through hours of sunlight but only while rays of the sun are hitting the lenses at certain angles of incidence. Further, it has been noted in such a conventional apparatus that any metal part thereof which is subjected to intense heat of focused rays is apt to be damaged.

SUMMARY OF THE INVENTION

The object of the present invention is to provide an apparatus which is efficient in heating water and free from the above-mentioned shortcomings.

According to the present invention, an apparatus for heating water by solar rays includes a number of spherical lenses which enable it to receive a maximum of radiation from the sun. Such lenses effectively converge solar rays all through hours of sunlight. The rays focused from the lenses subject intense heat to a superheat resisting carbon impregnated cloth which lines the metallic material forming part of a heat collecting member. A large number of such lenses are held by a suitable means within a glass covered box. The heat which is absorbed by the heat collecting members and which is trapped in the closed box warms the water contained in or circulating through a continuous pipe extending in convolutions within the box.

Therefore, the present invention provides an apparatus for heating water by solar rays comprising a plurality of spherical lenses positioned in a box covered by a glass at the side facing the sun, a plurality of heat collecting members each positioned below each of said spherical lenses, each of said heat collecting members being lined with a superheat resisting carbon impregnated cloth at the area subjected to focused rays, and a continuous water pipe extending in a number of convolutions within said box.

BRIEF DESCRIPTION OF THE DRAWINGS

A preferred embodiment of the present invention is hereinafter described by making reference to the attached drawings in which:

FIG. 2 is a partially enlarged section view of the apparatus cut at the line II–II of FIG. 1;

DESCRIPTION OF THE PREFERRED EMBODIMENT

Figure 1:
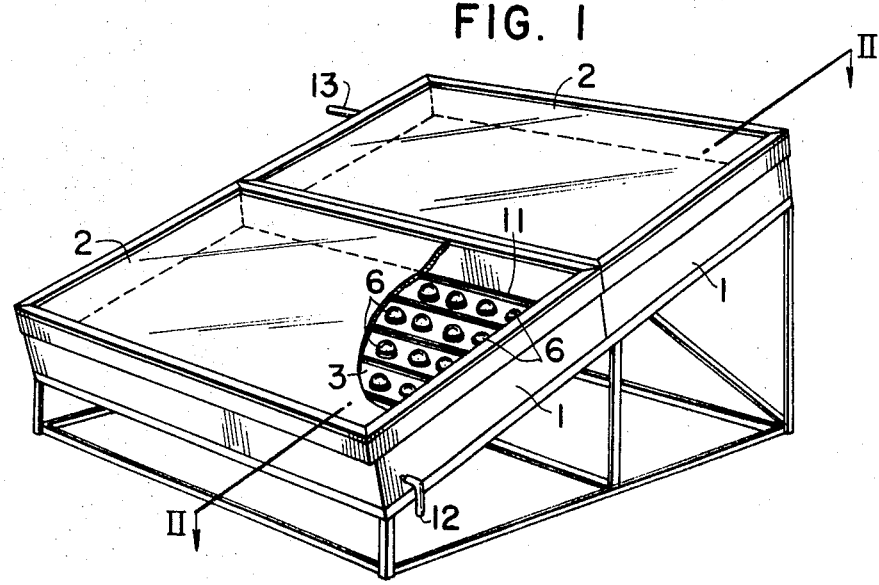
FIG. 1 is a general perspective view of an apparatus for heating water by solar rays according to the present invention (two units being combined)

Referring to FIG. 1, the apparatus comprises a box 1 covered by a glass 2 which functions to trap solar energy The box is placed at an appropriate angle in an elevated position, for example, on the southern slope of a roof. The box 1 in this example consists of two units, but the member of the units may be decreased or increased according to the need.

Figure 3:
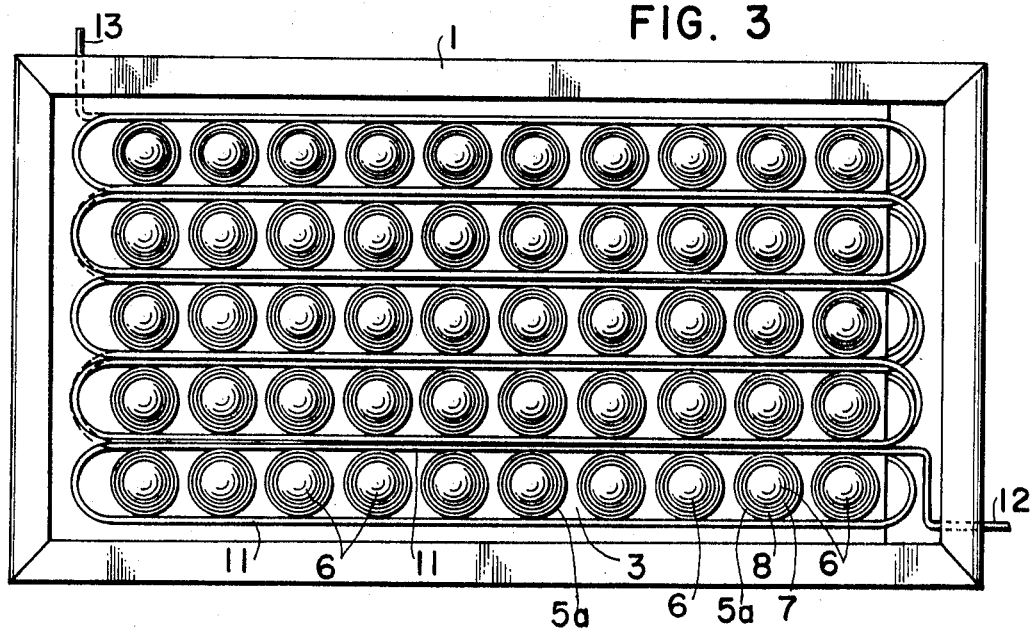
FIG. 3 is a plan view of a part of the apparatus (a single unit)
Figure 4:
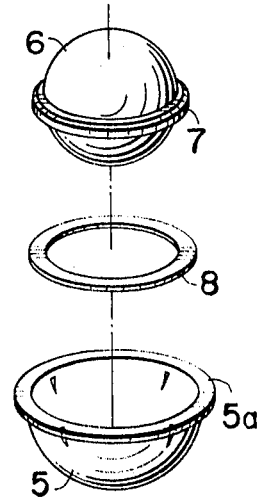
FIG. 4 is a perspective view of a spherical lens, a ring for supporting the lens, and a hemispherical member.

As seen from FIG. 3 and 4, the box 1 is partitioned by a a partition plate 3 having a plurality of regularly spaced holes 4 in rows. Each of these holes 4 receives a hemispherical member 5 having at its mouth a brim 5a which is welded to said partition plate 3.

A spherical lens 6, as seen from FIG. 4 may be made of glass and formed with a flangelike projection along its largest diameter. This flangelike projection sits on a ring 8 which is placed on said brim 5a of the hemispherical member 5. The diameter of the lens 6 is smaller than that of the mouth of the hemispherical member 5 so that the face of the lower hemisphere of the lens 6 and the inner face of the hemispherical member 5 are spaced at such a distance $d$ that the solar rays passing from the lens 6 focus on the surface of a superheat resisting carbon impregnated cloth 10 which lines the inner face of said hemispherical member 5. The focused rays heat said carbon impregnated cloth 10 to high temperatures which in turn heat said hemispherical members 5 and said partition plate 3. A continuous water pipe 11 is arranged in convolutions enclosing each row of said hemispherical members at both sides of the partition plate 3. Water is supplied to said water pipe 11 from a water inlet 12 and is discharged via an outlet 13. As water passes through said water pipe 11, it absorbs the heat from said partition plate 3 within said box 1 and is thereby heated to a high temperature.

Figure 5:
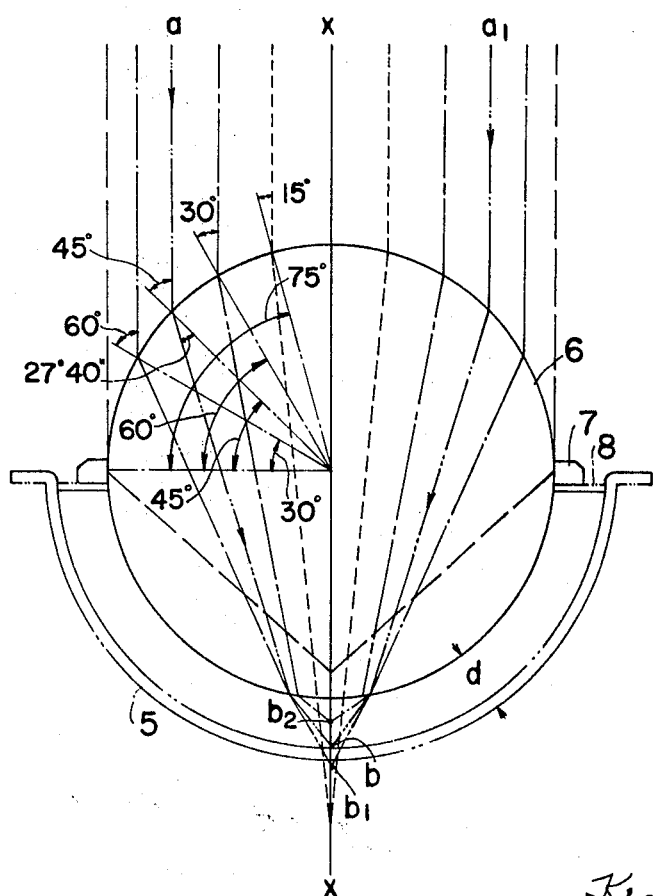
FIG. 5 is a diagram showing a state in which solar rays passing from the lenses converge on the inner face of the hemispherical members.

Since the spherical lenses 6 are sued in the present invention, parallel rays incident on the entire surface of the upper hemisphere of each lens are refracted therein in the ways as shown in FIG. 5. If, for example, the angle of incidence of rays $a, a_1$ is 45° and the index of refraction 1.518, the rays are refracted at an angle of 27°40′, and when the refracted rays pass from the lower hemisphere of the lens to the air within said box 5, they are again refracted at an angle of 45° The rays $a, a_1$ thus refracted converge at a point $b$ on the principal axis X–X. In the same way, the rays incident at an angle of 30° and 60° converge at a point $b_1$ and $b_2$, respectively. Therefore, if the space between the opposite faces of the hemispherical member 5 and the lens 6 is predetermined at an appropriate distance $d$ (for example, 8 mm. for a lens having a diameter of 40 mm.) with the point $b$ used as a reference, it is possible to constantly focus the rays on a portion of the carbon impregnated cloth 10 which lines the inner face of said hemispherical member and subject intensive heat thereto. The focal distance $d$ remains the same even when parallel rays incident on the lens 6 come from an oblique angle, as would happen just after sunrise and just before sunset. Therefore, as long as the sun is shining, that is from sunrise to sunset, the rays passing through the lenses focus at some portions on the carbon impregnated cloth on the hemispherical member 5. If there is no such heat-resisting cloth at the points where the rays focus, a material forming the hemispherical member would be damaged at such area. If the material used is aluminum whose melting point is 658° C., the focused rays would burn holes in such material. The carbon treated cloth 10 used in the present invention is that which is made by impregnating carbon therein and giving heat treatment thereto. Such a carbon treated cloth has the property of superheat resistance and can therefore withstand temperatures as high as 3000° C. Thus, even when the focused rays passing from the spherical lens result in as high a temperature as 1,400° C., which is possible on summer days, the carbon cloth used therein withstands such heat without being burnt. Thus the heated carbon cloth may be raised to a high temperature which is transmitted to the air inside the hemispherical member 5 and the intensive heat is conducted to said partition plate 3.

Since the water pipe 11, arranged in convolutions at both sides of said partition plate 3, could have a continuous length of some 30 meters, the water contained in or circulating through said pipe is effectively heated. The heating efficiency could be increased according to the need by combining two or more units of this apparatus. In such as case, the water heated in the first unit may be further communicated to the second unit. The heated water discharged from the outlet 12 is led to an appropriate hot-water storage tank which is not shown in the drawings.

While a preferred embodiment of the apparatus according to the present invention has been shown and described, it will be understood that many modifications and changes can be made within the scope of the invention.

I claim:

1. An apparatus for heating water by solar rays, said apparatus comprising:
- a plurality of spherical lenses positioned in a box covered by a glass on the side adapted to face the sun,
- a partition plate positioned parallel to said glass and having a plurality of rows of regularly spaced holes for receiving one of said spherical lenses therein,
- each of said spherical lenses being provided with a flangelike projection along the largest diameter thereof, said flangelike projection maintaining the respective lens in position in a hole of said partition plate,
- a plurality of heat collecting members,
- each of said collecting members being positioned below one of said spherical lenses,
- each of said collecting members being lined with a superheat resisting carbon impregnated cloth at the area subjected to focused rays,
- each of said collecting members comprising a hemispherical member having a brim for seating in a hole of said partition plate and a ring member for insertion between the respective brim of said hemispherical member and the respective flangelike projection of said lens,
- the diameter of said lens being smaller than that of the mouth of said hemispherical member so that the face of the lower hemisphere of said lens and the inner face of said hemispherical member are so spaced that the solar rays passing from the lens are focused on the surface of the superheat resisting carbon impregnated cloth lining the inner face of said hemispherical member, and
- a continuous water pipe extending in a number of convolutions within said box.

2. An apparatus for heating water by solar rays according to claim 1 in which said continuous water pipe passes around each row of said hemispherical members and convolutes to both sides of said partition plate within said box.